US012596028B2

(12) United States Patent
Huang et al.

(10) Patent No.: US 12,596,028 B2
(45) Date of Patent: Apr. 7, 2026

(54) METHOD AND SYSTEM FOR NON-INTERFEROMETRIC QUANTUM PHOTONICS VIBROMETRY

(71) Applicant: THE TRUSTEES OF THE STEVENS INSTITUTE OF TECHNOLOGY, Hoboken, NJ (US)

(72) Inventors: Yuping Huang, Norwood, NJ (US); Yongmeng Sua, Fort Lee, NJ (US); Patrick Rehain, Allendale, NJ (US); Shenyu Zhu, Jersey City, NJ (US); Daniel Tafone, Port Murray, NJ (US); Jeevanandha Ramanathan, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 882 days.

(21) Appl. No.: 17/899,493

(22) Filed: Aug. 30, 2022

(65) Prior Publication Data

US 2023/0288248 A1     Sep. 14, 2023

Related U.S. Application Data

(60) Provisional application No. 63/238,707, filed on Aug. 30, 2021.

(51) Int. Cl.
*G01H 9/00* (2006.01)
*H01S 3/00* (2006.01)
(Continued)

(52) U.S. Cl.
CPC ........... *G01H 9/004* (2013.01); *H01S 3/0071* (2013.01); *H01S 3/094026* (2013.01); *H01S 3/094076* (2013.01); *H01S 3/1106* (2013.01)

(58) Field of Classification Search
None
See application file for complete search history.

(56) References Cited

U.S. PATENT DOCUMENTS 5,850,285 A     12/1998  Hill et al.
6,480,265 B2    11/2002  Maimon et al.
(Continued)

FOREIGN PATENT DOCUMENTS

CN      107070651 A1     11/2006
CN      202048988 U      11/2011
(Continued)

OTHER PUBLICATIONS

Jason Lin et al., "Quantum private comparison of equality protocol without a third party", arxiv. org, vol. 13, No. 2, Oct. 1, 2013, pp. 239-247.
(Continued)

*Primary Examiner* — Eric S. McCall
*Assistant Examiner* — Nigel H Plumb
(74) *Attorney, Agent, or Firm* — Clark Hill PLC; Ralph W. Selitto; John K. Kim

(57) ABSTRACT

Approaches, apparatuses and methods for single photon sensitive, non-interferometric photonics vibrometry applications based on quantum parametric mode sorting, optical gating and single photon counting are disclosed. In one embodiment, a controller module includes a photon detection unit, a pulse generator unit, a time synchronization unit, a data acquisition and processing unit and a central controller unit. In the second embodiment, a probe module with beam raster scanning ability includes an optical transceiver unit based on a bidirectional monostatic coaxial arrangement using off-the-shelf optical components and an optical beam steering device.

29 Claims, 19 Drawing Sheets

(51) Int. Cl.
    *H01S 3/094*        (2006.01)
    *H01S 3/1106*     (2023.01)

(56) References Cited

U.S. PATENT DOCUMENTS

| | | | |
|---|---|---|---|
| 6,483,592 B2 | 11/2002 | Pedigo | |
| 7,567,596 B2 | 7/2009 | Dantus et al. | |
| 7,679,743 B1 * | 3/2010 | Jung | G01N 15/0205 |
| | | | 356/336 |
| 8,072,609 B1 | 12/2011 | Trivedi et al. | |
| 8,309,929 B2 | 11/2012 | Bond et al. | |
| 8,339,581 B2 | 12/2012 | Guha et al. | |
| 8,621,931 B2 | 1/2014 | Phua et al. | |
| 8,665,923 B2 | 3/2014 | Sprangle et al. | |
| 8,761,606 B2 | 6/2014 | Habif | |
| 9,596,421 B1 | 3/2017 | Itzler | |
| 9,696,133 B2 | 7/2017 | Yuan et al. | |
| 9,945,948 B2 | 4/2018 | Yang et al. | |
| 10,168,198 B2 * | 1/2019 | Cobianu | G01F 23/2961 |
| 10,634,553 B1 * | 4/2020 | Hveding | G01K 11/3206 |
| 10,860,746 B2 | 12/2020 | Foster et al. | |
| 11,003,046 B2 | 5/2021 | Liscidini | |
| 11,264,775 B2 | 3/2022 | Huang | |
| 11,442,697 B2 | 9/2022 | Huang et al. | |
| 2002/0097962 A1 | 7/2002 | Yoshimura et al. | |
| 2004/0136634 A1 | 7/2004 | Chowdhury et al. | |
| 2005/0123242 A1 | 6/2005 | Walker | |
| 2006/0083379 A1 | 4/2006 | Brookner | |
| 2006/0245680 A1 | 11/2006 | Rasmussen et al. | |
| 2008/0138087 A1 | 6/2008 | Snyder | |
| 2009/0046296 A1 | 2/2009 | Kilpatrick et al. | |
| 2010/0124787 A1 | 5/2010 | Nitkowski et al. | |
| 2013/0036145 A1 | 2/2013 | Pruneri | |
| 2014/0098955 A1 | 4/2014 | Hughes | |
| 2014/0192363 A1 | 7/2014 | Kippenberg et al. | |
| 2015/0323450 A1 | 11/2015 | Lipson et al. | |
| 2016/0234017 A1 | 8/2016 | Englund | |
| 2017/0131388 A1 | 5/2017 | Campbell et al. | |
| 2018/0241480 A1 | 8/2018 | Hughes | |
| 2020/0257502 A1 | 8/2020 | Steinle | |
| 2020/0274703 A1 | 8/2020 | Lukens | |
| 2020/0285131 A1 | 9/2020 | Marandi et al. | |
| 2021/0080805 A1 | 3/2021 | Srinivasan et al. | |
| 2021/0116543 A1 * | 4/2021 | Huang | G01S 7/4814 |
| 2021/0156684 A1 | 5/2021 | Huang | |
| 2021/0247662 A1 | 8/2021 | Dorche et al. | |
| 2022/0075238 A1 | 3/2022 | Huang et al. | |
| 2023/0079367 A1 | 3/2023 | Huang et al. | |
| 2023/0155823 A1 | 5/2023 | Huang et al. | |
| 2023/0168563 A1 | 6/2023 | Huang et al. | |

FOREIGN PATENT DOCUMENTS

| | | | |
|---|---|---|---|
| CN | 107528686 A | 12/2017 | |
| CN | 111897054 A | 11/2020 | |
| EP | 3477362 A1 | 6/2019 | |
| EP | 3286603 B1 | 2/2020 | |
| GB | 2510916 A | 4/2015 | |
| JP | 4091956 B2 | 5/2008 | |
| KR | 101899026 B1 | 10/2018 | |
| WO | 2013112351 A2 | 8/2013 | |
| WO | 2018031916 A1 | 2/2018 | |
| WO | 2019241582 A1 | 6/2020 | |
| WO | WO2021226395 A1 | 11/2021 | |
| WO | WO2021231794 A1 | 11/2021 | |
| WO | WO2023004148 A1 | 1/2023 | |

OTHER PUBLICATIONS

Goorden, Sebastianus & Horstmann, Marcel & Mosk, Allard & Skoric, Boris & Pinkse, Pepijn. (2013), "Quantum-Secure Authentication with a Classical Key".

Arapinis et al. "Quantum Physical Unclonable Functions: Possibilities and Impossibilities," Jun. 15, 2022, Quantum 5, 475 (2021). arXiv:1910.02126v4.

F. Xu, Experimental fast quantum random number generation using high-dimensional entanglement with entropy monitoring, Optica 3, 1266-1269 (2016).

Hochrainer, Armin, Low-Loss Optical Elements for a Loophole-Free Bell Test, 2014 (Thesis).

Lee, H., Chen, T., Li, J. et al. Ultra-low-loss optical delay line on a silicon chip. Nat Commun 3, 867 (2012). https://doi.org/10.1038/ncomms1876.

Fiorentino, Marco & Munro, William & Santori, Charles & Spillane, Sean & Beausoleil, Ray. (2006). All-Fiber-Optic Quantum Random Number Generator. 1-2. 10.1109/CLEO.2006.4628717.

Nguyen L, Rehain P, Sua YM, Huang YP. Programmable quantum random number generator without postprocessing. Opt Lett. Feb. 15, 2018;43(4):631-634. doi: 10.1364/OL.43.000631. PMID: 29444039.

Nguyen, Lac & Rehain, Patrick & Sua, Yong Meng & Huang, Yu-Ping. (2018). Quantum Random Number Generator with Programmable Probability Distributions. JTu3A.30. 10.1364/FIO.2018. JTu3A.30.

Kumar, S., Zhang, H. & Huang, YP. Large-scale Ising emulation with four body interaction and all-to-all connections. Commun Phys 3, 108 (2020). https://doi.org/10.1038/s42005-020-0376-5.

D. Pierangeli, G. Marcucci, and C. Conti, Large-Scale Photonic Ising Machine by Spatial Light Modulation. Phys. Rev. Lett. 122, 213902—Published May 31, 2019.

Roques-Carmes, C., Shen, Y., Zanoci, C et al. Heuristic recurrent algorithms for photonic Ising machines. Nat Commun 11, 249 (2020). https://doi.org/10.1038/s41467-019-14096-z.

Shahverdi A, Sua YM, Dickson I, Garikapati M, Huang YP. Mode selective up-conversion detection for LIDAR applications. Opt Express. Jun. 11, 2018;26(12):15914-15923. doi: 10.1364/OE.26. 015914. PMID: 30114845.

Geiser, P., Willer, U., Walter, D., and Schade, W., "A subnanosecond pulsed laser-source for mid-infrared LIDAR", Applied Physics B: Lasers and Optics, vol. 83, No. 2, pp. 175-179, 2006. doi: 10.1007/s00340-006-2158-5.

Shahverdi, Amin & Sua, Yong Meng & Tumeh, Lubna & Huang, Yu-Ping. (2017). Quantum Parametric Mode Sorting: Beating the Time-Frequency Filtering. Scientific Reports. 7. 10.1038/s41598-017-06564-7.

J. Lu, J. Surya, X. Liu, A. Bruch, Z. Gong, Y. Xu, and H. Tang, "Periodically poled thin-film lithium niobate microring resonators with a second-harmonic generation efficiency of 250,000%/W," Optica 6, 1455-1460 (2019).

Fu. Y., Guo, M., & Phua, P. B. (2010). Spatially encoded multibeam laser Doppler vibrometry using a single photodetector, Optics Letters, 35(9), 1356-1358.

Yanlu Li, Jinghao Zhu, Matthieu Duperron, Peter O'Brien, Ralf Schüler, Soren Aasmul, Mirko de Melis, Mathias Kersemans, and Roel Baets, "Six-beam homodyne laser Doppler vibrometry based on silicon photonics technology," Opt. Express 26, 3638-3645 (2018).

Patrick Rehain, Jeevanandha Ramanathan, Yong Meng Sua, Shenyu Zhu, Daniel Tafone, and Yu-Ping Huang, "Single-photon vibrometry," Opt. Lett. 46, 4346-4349 (2021).

Jiuyi Zhang, Yong Meng Sua, Jia-Yang Chen, Jeevanandha Ramanathan, Chao Tang, Zhan Li, Yongxiang Hu, Yu-Ping Huang; Carbon-dioxide absorption spectroscopy with solar photon counting and integrated lithium niobate micro-ing resonator. Appl. Phys. Lett. Apr. 26, 2021; 118 (17): 171103. https://doi.org/10.1063/5.0045869.

Tri Cao Doan, Resonant Matter Wave Amplification in Mean Field Theory, arXiv: 1112.3325v1 Quantum Gases, Dec. 14, 2011.

Hu, Yi & Siviloglou, Georgios & Zhang, Peng & Efremidis, Nikolaos & Christodoulides, Demetrios & Chen, Zhigang. (2012). Self-accelerating Airy Beams: Generation, Control, and Applications. 10.1007/978-1-4614-3538-9_1.

Yu-Ping Huang and Prem Kumar, "Mode-resolved photon counting via cascaded quantum frequency conversion," Opt. Lett. 38, 468-470 (2013).

(56)     References Cited

OTHER PUBLICATIONS

Abijith S. Kowligy, Paritosh Manurkar, Neil V. Corzo, Vesselin G. Velev, Michael Silver, Ryan P. Scott, S. J. B. Yoo, Prem Kumar, Gregory S. Kanter, and Yu-Ping Huang, "Quantum optical arbitrary waveform manipulation and measurement in real time," Opt. Express 22, 27942-27957 (2014).

Jingle Liu, Jianming Dai, See Leang Chin, and X.-C. Zhang, "Broadband terahertz wave remote sensing using coherent manipulation of fluorescence from asymmetrically ionized gases," Nature Photonics, vol. 4, (Sep. 2010).

R. Sferopoulos, "A Review of Chemical Warfare Agent (CWA) Detector Technologies and Commercial-Off-The-Shelf Items," DSTO Defence Science and Technology Organisation, Fishermans Bend, Victoria, Australia (2009).

Scully, et al., "Quantum Optics," Published by Cambridge University Press, 1997.

Huang, et al., "Heralding single photons without spectral factorability", Phys. Rev. A 82, 043826 (2010).

Seth Lloyd, "Enhanced Sensitivity of Photodetection via Quantum Illumination", Science321,1463-1465(2008). DOI:10.1126/science.1160627.

* cited by examiner

RAW PHOTON COUNTING DATA

TIME (S)

PHOTON COUNTS

POWER SPECTRUM 6:12.5 SECONDS

METHOD AND SYSTEM FOR NON-INTERFEROMETRIC QUANTUM PHOTONICS VIBROMETRY

CROSS-REFERENCE TO RELATED APPLICATION

This Application Claims priority to U.S. Provisional Patent Application Ser. No. 63/238,707 filed Aug. 30, 2021, the entire disclosure of which is incorporated herein by reference.

STATEMENT REGARDING FEDERALLY SPONSORED RESEARCH

This invention was made with government support under Grant No. W15QKN-18-D-0040 awarded by the ARMY CONTRACTING COMMAND, PICATINNY ARSENAL, NJ. The U.S. government has certain rights in the invention.

FIELD OF THE INVENTION

The present invention relates to laser/optical/photonics vibrometry for mechanical vibration and acoustic measurement and profiling.

BACKGROUND OF THE INVENTION

Mechanical vibration is a ubiquitous physical phenomenon over a vast area of science and technology. Vibration detection and measurement are crucial over various fields including bio-medical diagnostics and imaging, structural monitoring and material properties studies.

Conventional vibration detection by in-contact measurement, such as piezoelectric accelerometers, electroacoustic sensors, distributed fiber-optic interferometry vibration sensors, are highly restrictive in practical uses, due to, for example, undesired mass-loading effects and difficulties in sensor installation and operation in harsh environment. In many circumstances, remote and noncontact vibration measurements with a wide frequency response, refined frequency resolution, and certain spatial resolution are desirable.

To this end, laser Doppler vibrometry (LDV) that is robust and offers significant higher flexibility in field deployment has become an increasingly popular vibration detection technique for various fields. Indeed, using the photon at the speed of light to perform measurement at distance allows one to probe the intended target with minimum concern on the harsh environment or photon-starved applications. Yet LDV faces critical challenges such as the requirement of almost transparent line of sight and ample detected optical signals considerably above the ambient and shot noise of the photon detectors. The LDV is based on phase sensitive interferometric measurement, thus susceptible against the phase noise due to the speckle pattern arising from illumination surface's imperfection or relative off-axis motions between laser beam and target.

SUMMARY OF THE INVENTION

A novel non-interferometric approach to remote sensing and fast profiling of mechanical vibration and acoustic waves at single photon level sensitivity is presently disclosed. The inventive method utilizes quantum parametric mode sorting and ultrafast optical gating in a nonlinear medium together with single photon detection to substantially enhance measurement sensitivity to single photons while minimizing the effects of the various speckle, ambient, and atmospheric noise.

The present invention provides optical remote vibration and acoustic sensing with extreme sensitivity through use of a non-interferometric quantum photonic approach, obtaining single photon (e.g., $10^{-18}$ Joules per pulse) detection sensitivity while rejecting background noise. The sensitivity of the present invention results in a detected signal to noise ratio that is several orders of magnitude higher when compared with conventional and commercially available laser vibrometers. This allows for vibration or acoustic optical sensing at very low optical powers, extended long range, operability in harsh environments, and/or without line-of-sight, which the current state of art laser Doppler vibrometry does not achieve.

The inventive method uses a novel non-interferometric photon counting method with single photon sensitivity. Thus, it provides fundamental improvements in detection limit when compared to LDV with homodyne detection performed with a reference beam and photodiode. Furthermore, this approach also overcomes the laser's coherence length limit of interferometric LDV, allowing for remote sensing at extended ranges. In addition, the present invention utilizes quantum parametric mode sorting and ultrafast optical gating in a nonlinear medium to reject the ambient and atmosphere noise, thus allowing its operation at the single photon level, even with the presence of high background noise photons.

Such an approach overcomes many limitations of LDV, allowing for a long working distance that extends beyond kilometer scale. The inventive methods are further capable of robust performance in hostile environments that feature high losses, strong turbulence, and multiscattering, etc. Furthermore, the present method is effective even for non-compliant surfaces. To this end, present invention may be used in vibration or acoustic sensing, motion detection over strong turbulence, multiscattering media, or when line-of sight is not available.

The present invention may operate at eye safe 1550 nm at low laser power, in contrast to typical laser vibrometers in visible wavelengths, which are restricted in their deployable optical power due to eye-hazard risks.

In addition, single photon sensitivity for ultra-low light or single photon level vibrometry may be of interest for a plethora of applications in biomedical engineering, manufacturing, public safety, national security and fundamental science. It may particularly be useful in non-line-of-sight imaging systems where the scene of interest is indirectly accessed via low-light level reflections off intermediary surfaces.

In accordance with one embodiment of the present invention, a method for remote vibration and acoustic measurement can involve the steps of creating a probe signal, creating a pump optical pulse, collimating the probe signal, transmitting the probe signal to a target, receiving a backscattered signal from the target, temporally aligning the pump optical pulse with the backscattered signal, upconverting the backscattered signal to obtain a frequency upconverted backscattered signal, performing picosecond time gating detection and quantum parametric mode selection on the frequency upconverted backscattered signal to obtain photon counting data, and obtaining vibration and/or acoustic measurement data from the photon counting data. In certain embodiments, the probe signal and pump optical pulse have frequencies between the ultraviolet and infrared bands. In other embodiments, the photon counting data is single-photon sensitive. In another embodiment, the upconverting step involves the step of converting only photons in a single spatial-temporal mode similar to the shape of the pump optical pulse. In certain embodiments, the background noise photons in all other modes other than the single spatial-temporal mode are rejected.

The pump optical pulse and the probe signal are created using an optical pulse generator in some embodiments. Such an optical pulse generator can comprise a femtosecond mode locked fiber laser, a synchronized electro-opto pulse generator and/or a synchronized picosecond mode locked fiber laser. The optical pulse generator may further include an optical frequency comb and a femtosecond mode locked fiber laser. In another embodiment, the optical pulse generator comprises one or more electro-optic pulse generators adapted to synchronize the probe signal with the pump optical pulse. In an embodiment, the transmitting step is performed using an optical transceiver, which can be integrated as free space optics or fiber, or as an integrated photonics chip. Additionally, the probe signal may be steered using a beam steering unit. Such a beam steering unit can include micro electro mechanical system based mirrors or digital micro-mirror devices. In other embodiments, the optical transceiver is further configured to operate as a receiver to facilitate receiving a backscattered signal from the target.

In an embodiment, picosecond time gating can be performed with a single photon detection unit. In some embodiments, such a single photon detection unit is capable of mode selective frequency conversion. In further embodiments, the single photon detection unit is also adapted to perform upconversion. The upconverting may also be performed by a nonlinear waveguide, optical bandpass filters, and/or a photodiode configured to detect upconverted signals. Such a waveguide may be a periodically poled lithium niobate waveguide.

In some embodiments, a controller module can be used to obtain vibrational and/or acoustic data. Moreover, the temporally aligning step may be facilitated by passing the pump optical pulse through an optical delay line controlled by the controller module. To this end, a mathematical transform can be performed on the photon counting data. Such a transform can be, for instance, a Fourier Transform.

In an embodiment a device made in accordance with the present invention can be adapted for use at ranges of about one kilometer or more. The inventive device can also be adapted for use with nonlinear media and/or multiscattering or highly scattering media. In certain embodiments, the present invention can be used with targets outside of the line-of-sight or in the presence of strong turbulence.

In one embodiment, a system for remote vibration and acoustic measurement made in accordance with an embodiment of the present invention can include means for creating a probe signal, means for creating a pump optical pulse, means for collimating the probe signal, means for transmitting the probe signal to a target, means for receiving a backscattered signal from the target, means for temporally aligning the pump pulse with the backscattered signal, means for upconverting the backscattered signal to obtain a frequency upconverted backscattered signal, means for performing picosecond time gating detection on the frequency upconverted backscattered signal and performing quantum parametric mode selection on the frequency upconverted backscattered signal to obtain photon counting data, and means for extracting vibration and/or acoustic measurement data from the photon counting data.

BRIEF DESCRIPTION OF THE DRAWINGS

For a more complete understanding of the present invention, reference is made to the following detailed description of an embodiment considered in conjunction with the accompanying drawings, in which.

DETAILED DESCRIPTION OF THE EXEMPLARY EMBODIMENT

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms "a", "an", "the", and "one" include the plural referents unless otherwise stated. Additionally, the terms "comprises" and "comprising" when used herein specify that certain features are present in that embodiment, however, this phrase should not be interpreted to preclude the presence or addition of additional steps, operations, features, components, and/or groups thereof.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
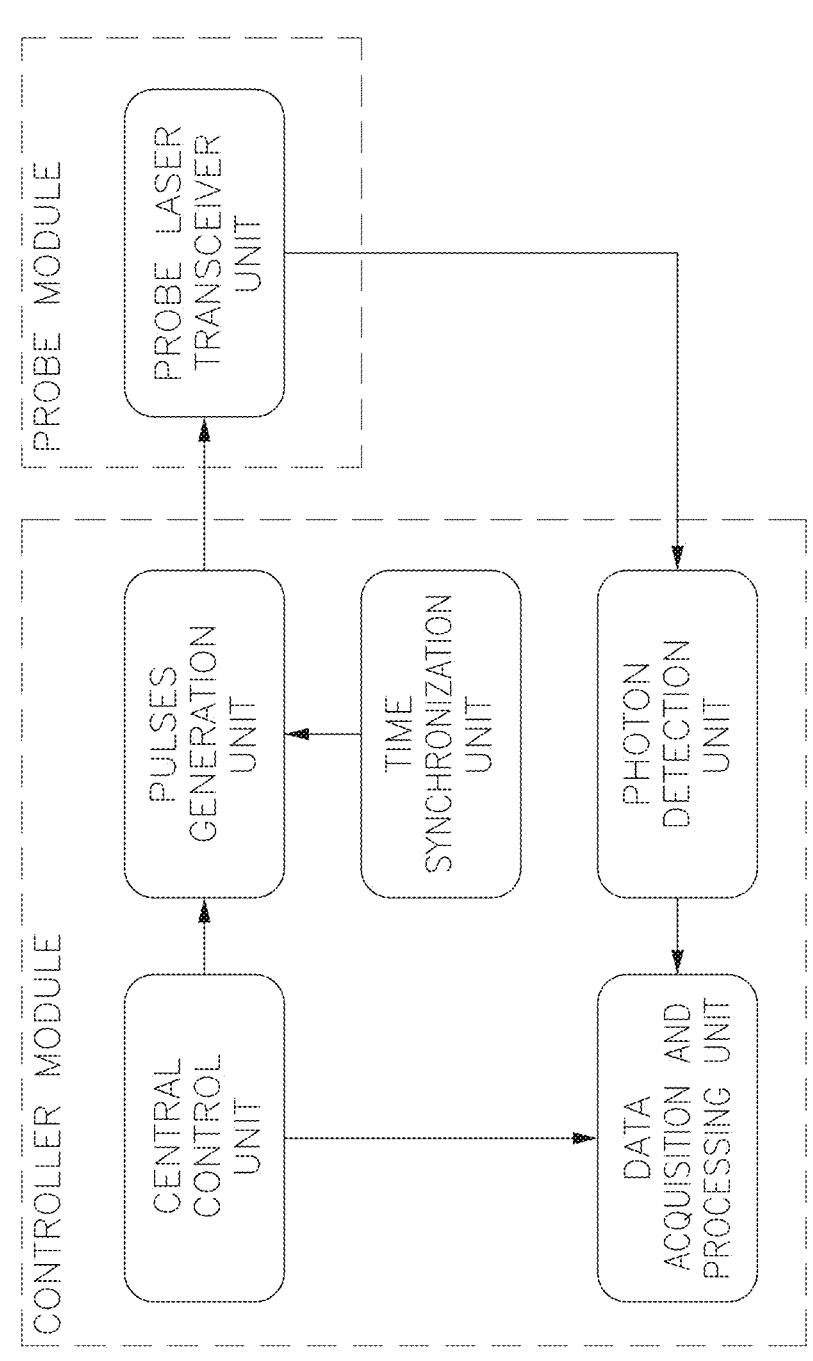
FIG. 1 is a conceptual diagram for quantum photonics vibrometry in accordance with an embodiment of the present invention.

The approaches, apparatuses and methods disclosed herein demonstrate a non-interferometric quantum photonics vibrometer (QPV) which may include one optical transceiver unit, a photon detection unit, a pulse generator unit, a time synchronization unit, a data acquisition and processing unit, and a central controller unit (see FIG. 1). The optical transceiver can be based on a simple monostatic coaxial arrangement using off-the-shelf telecom-grade optical components, including filters, optical circulators and collimators, in the form of free space optics, fiber optics, or integrated photonics. The time synchronization unit can be derived from electrical crystal oscillators or stable optical oscillators with low timing jitter.

In the pulse generation unit, synchronized pump and probe optical pulses are obtained from an optical pulse generator. The synchronized pump and probe optical pulses can be generated by using a femtosecond mode locked fiber laser, synchronized electro-opto pulse generators, or synchronized picosecond mode locked fiber lasers. The wavelength of the pump and probe optical pulses can range from the UV to the IR region in the electromagnetic spectrum. The pulse width and temporal shape of the optical pulses can be tailored by using wavelength division multiplexing (WDM) filters, waveshapers, diffraction gratings, etc., for any specific application. The optical pulse generator unit comprises a femtosecond mode-locked fiber laser and optical frequency comb, where the synchronized pump and probe optical pulses are spectrally carved out by using separate sets of cascaded spectral filters. Alternatively, electro-optic pulse generators can be used to generate synchronized pump and probe optical pulses at specific wavelengths. The repetition rate of the generated pulse can be set within the laser or by employed using a pulse picking system.

Figure 2:
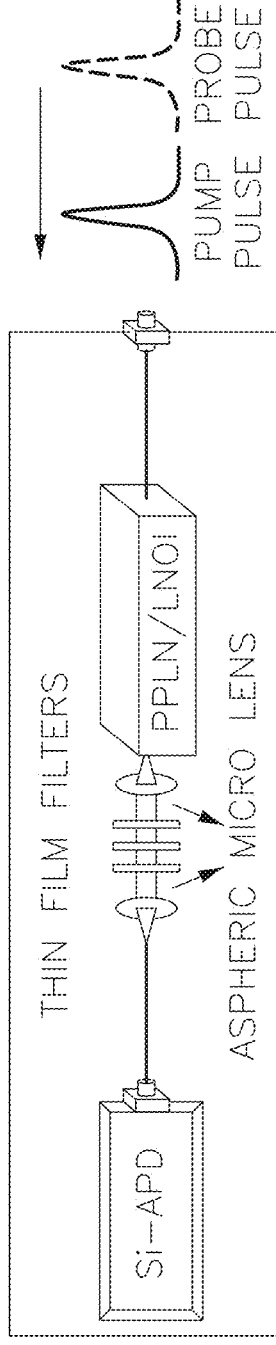
FIG. 2 is a schematic diagram depicting a single photon upconversion detection module useful for picosecond optical gating and quantum parametric mode sorting, in accordance with an embodiment of the present invention.

Through the transceiver, the probe pulses are sent out to probe the target scene via a collimating optical transceiver. A beam steering unit can be used to scan the optical beam after the transceiver by using micro electro mechanical system (MEMS) based mirrors or digital micro-mirror devices (DMD). The backscattered probe pulse may be collected via the transceiver after interacting with the target. The transceiver can be in the form of free space optics or fiber or integrated photonics chip. Meanwhile, the pump pulses are sent to a programmable optical delay line (ODL) in the module. Pump pulses are then combined with the backscattered probe signal carrying the acoustic information and sent to the single photon detection unit with ultrafast optical gating, such as that with a picosecond time window, and in some embodiments, capable of mode selective frequency conversion. An exemplary single photon upconversion detector is shown in FIG. 2. The detector can be assembled in the form of free space optics or fiber or integrated photonic chip. When frequency conversion is involved, the detector is comprised of a nonlinear waveguide, optical bandpass filters and a Silicon Avalanche photodiode (Si-APD) configured to detect the up-converted signals. The nonlinear waveguide will translate the frequency of the collected backscattered probe pulse from an infrared wavelength to a visible wavelength by the pump pulse, which also carries out the ultrafast optical gating pulse.

In an exemplary embodiment, 1554.1 nm signal pulses and a periodically poled lithium niobate (PPLN) waveguide are used for the up-conversion. Unlike previous studies where inconvenient, far red-detuned pump lasers at around 2 μm are required to reduce Raman scattering noise, the present invention can use pump pulses at 1565.5 nm to convert the signal to 779.8 nm in some embodiments. This is feasible because the use of short pump pulses and the subsequent spectral filtering substantially reduces the Raman noise.

The detector can be configured to have picosecond optical gating to perform mode-selective frequency conversion of the collected backscattered signals and to detect the converted signals by choosing the appropriate pulse width. Using both the pump and signal in the telecom band, the present invention takes advantage of current compact laser and fiber components to realize an eye-safe, practical and cost-effective photonics vibrometer system. In some embodiments, by approaching the phase matching bandwidth of the PPLN waveguide using picosecond optical pulses, the present invention shows that only photons in a single spatio-temporal mode, similar to the pump pulse shape in this case, are converted efficiently, while background noise photons in all other modes are rejected, thereby exhibiting significantly enhanced measurement signal to noise ratio (SNR) compared to direct detection using an indium-gallium-arsenide avalanche photodiode (InGaAs-APD). Operating the nonlinear up-conversion single photon detector at unity conversion efficiency leads to total signal detection efficiency of 34% with dark count probability per pulse of only $0.4 \times 10^{-5}$. The dark counts are primarily attributed to Raman noise photons generated in the upconverison waveguide, as the Si-APDs dark count level is negligible. Note that Raman noise photons are maximally filtered out by the mode selectivity of the conversion. The picosecond optical gating also enables profiling and measurement ranges of around 1 mm, which goes well beyond the limit of timing resolution for the Si-APD and the electronic readout jitter of the entire system.

By the means of frequency up-conversion, the SNR of single photon detection will be enhanced. In this manner, performance limitations of commercial single-photon detectors used in telecommunications and photo detection systems in mid-IR wavelengths where highly sensitive and low noise detectors are not available, or require cryogenic cooling can be overcome. The invention disclosed herein also address the deficiencies in vibration sensing which are limited by the presence of noise from many sources and detection limitations of optical signals, in terms of sensitivity and signal-to-noise ratio, are obstacles for many applications.

Figure 3:
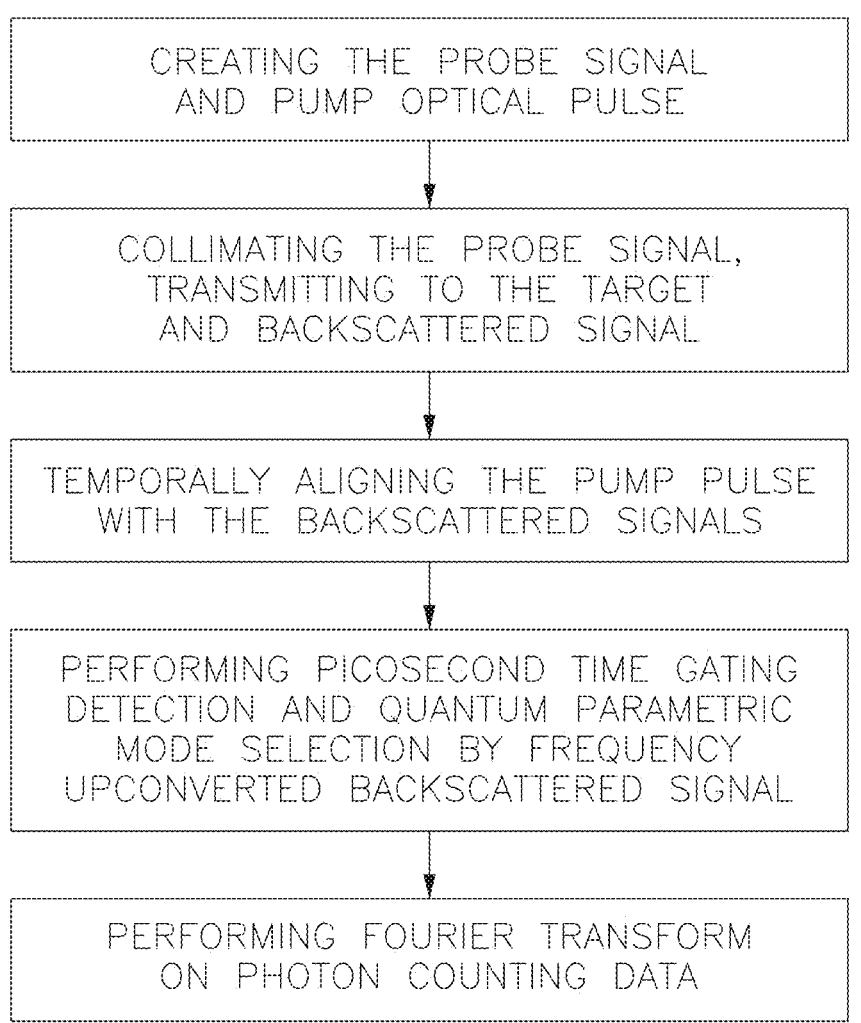
FIG. 3 is a flow chart illustrating steps performed using the systems described in FIGS. 1 and 2.

The operation steps for performing photonics vibrometry presented in accordance with an embodiment of the present invention are illustrated in the flow chart of FIG. 3.

In an embodiment of the present invention, a field-programmable-gate-array (FPGA) in the controller module is used as the central processor for controlling the ODL, data acquisition and signal processing.

In an embodiment, the raw photon counting data is recorded by the inventive photonics vibrometer probing a target at a distance over certain period of data acquisition time. The photon detection signal from the SI-APD will be sampled by the FPGA to obtain photon count as function of time.

In one embodiment, Fourier transforms, or in general, any mathematical transform, may be applied to convert the time series photon counting data to a frequency domain representation in the form of spectrogram. The vibrational properties of the probed target will be revealed directly in the spectrogram or indirectly via further signal processing and analysis. The signal processing and analysis techniques can be applied to both time and frequency representations of the data, including but not limited to, frequency bandpass, high pass and low pass filters, time sectioning, and averaging. In an embodiment, the short-time Fourier transform of the time series photon counting data can be performed in real time on the time series spectrogram, enabling visualization of the dynamics of the dataset in the Fourier domain.

The present invention can be used to overcome the range limit of coherent LDV systems, which require adequate returning optical signals to create measurable interference in the detected photocurrent, which is much higher than the detector shot noise and electronic noise.

The present invention is also single photon sensitive, and thus suitable for photon-starved or weak illuminating applications where the returning optical signal is very weak, either due to non-reflective targets, or lossy or multiscattering environments. While in principle this challenge can in some cases be overcome by increasing the outgoing power of the probe signal, it is not always possible or practical where cost effectiveness and/or eye-safety concerns are of relevance. Another issue with coherent detection in LDV is its extreme sensitivity to any phase disturbances in the returning optical signal.

The present invention maybe used for various target surfaces, including those with roughness larger than the optical wavelength, which can totally dephase the signal and lead to a randomly speckled interference pattern, which is problematic for interferometric LDV. They can also lead to the low-levels of detected signals when summing dark regions of the speckle, or when bright speckles destructively interfere.

The present invention can be used to overcome the challenge of speckle noise faced by LDV systems that comes from changing speckle patterns that create a modulation effect in the amplitude and phase of the measured signal, which can be difficult to demodulate from the true signal. This effect is usually the result of target motion in directions transverse to the optical beam but can also be caused by anything that changes the angle of the incident beam relative to the target surface. As such, scattering obscurants and dynamic turbulent environments will also cause speckle noise. Some of these disturbances lead to periodically changing speckle patterns, but because the patterns are random, the resulting features in the measured signal can be complicated and difficult to deal with. This is especially the case when frequencies in the speckle noise are close to the true signal frequencies. While various techniques have been developed to mitigate the effects of such speckle noise, it remains a main obstacle and limiting factor for LDV applications.

In an embodiment, the present invention utilizes the change of speckle noises in the returning signals that are caused by the oscillations of the measured targets, due to which the photon counts vary. In this case, the fine-time gating of the disclosed upconversion single photon detection and quantum parametric mode sorting systems will then help reject background photons not coming from the targets.

By taking advantage of highly efficient quantum frequency conversion to upconvert near-IR single photons to visible wavelengths prior to detection in Si-APDs, the eye-safe QPV can be deployed in various settings without many restrictions, while minimizing the operation and device costs.

Example 1: Device Configuration

An exemplary configuration for the proposed transceiver employed for photonics vibrometry applications is presently described. In the detection unit, the single photon upconversion detection module is realized by implementing a 2-cm periodically poled lithium waveguide. This waveguide is configured to take inputs at the telecom C-band and generate sum frequencies at visible wavelength with a normalized conversion efficiency of 140% $W^{31}$ $^{1}\cdot cm^{-2}$, which may lead to total signal detection efficiency of 34%. The phase matching bandwidth of this waveguide is 90 GHz at full-width half-maximum centered at 1559.7 nm. So the wavelength of the received probe signal and triggering pump are set at 1555.7 nm and 1565.3 nm, respectively. Both the probe and triggering pumps are 6-ps Gaussian pulses. Based on this configuration, only received signal in a Gaussian waveform with a pulse width of 6 ps is efficiently up-converted to the sum frequency wavelength of 779.8 nm for photon counting detection.

Figure 4:
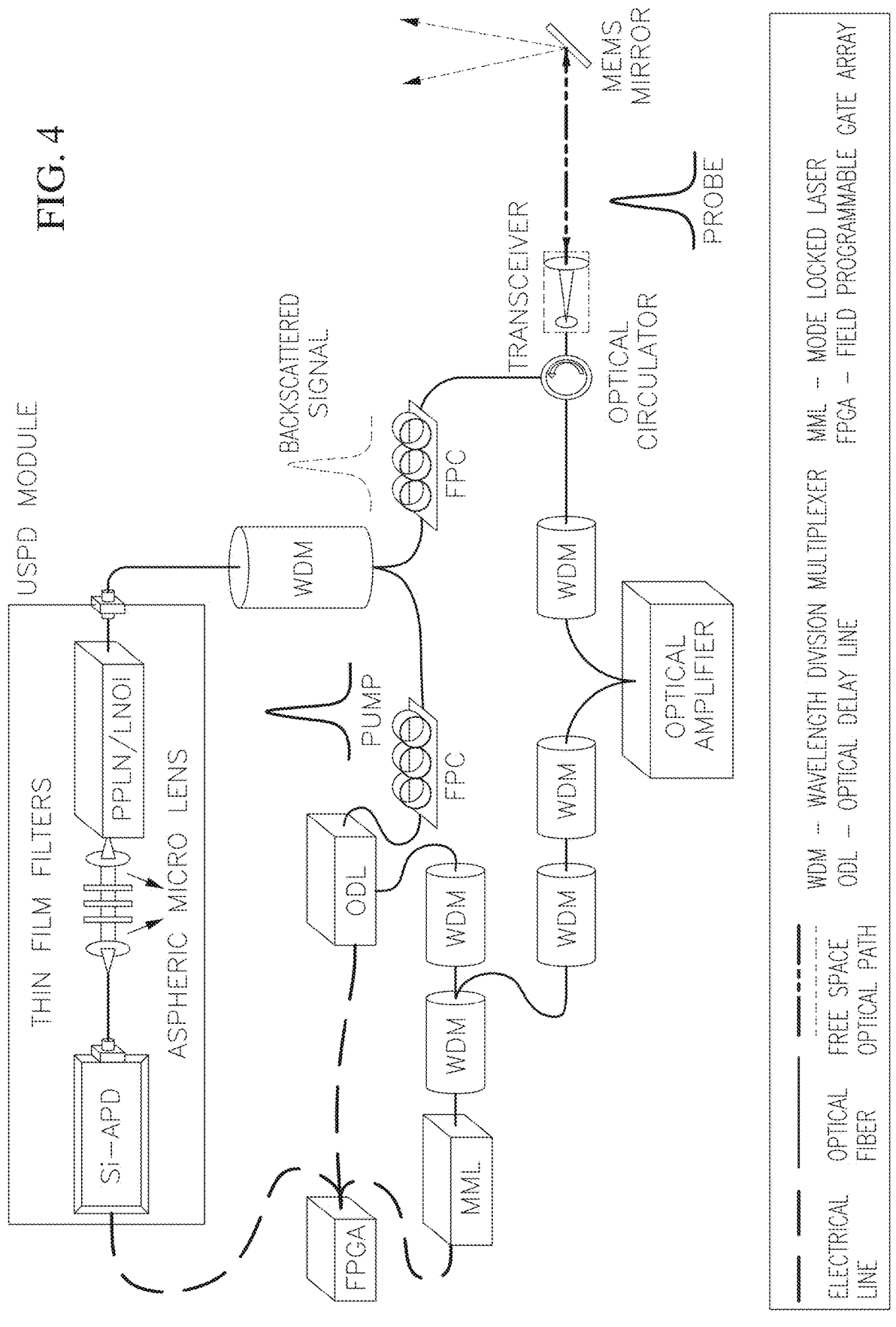
FIG. 4 is a schematic diagram depicting a quantum photonics vibrometer made in accordance with FIG. 1.

FIG. 4 shows an exemplary demonstration of both the controller module and transceiver, comprising a pulse generation and timing unit, a collimation and scanning unit, and a detection unit. The 6-ps probe and pump pulses are created by the pulse generation unit where two pulses are spectrally carved from a high power femtosecond mode-locked laser such as that having a pulse repetition rate of 50 MHz by using a set of WDM filters. A suitable laser is available from Calmar Laser (e.g. the Mendocino series). In some embodiments, a programmable optical delay line (e.g., General Photonics MDL-002) with the scan range of 512 ps and resolution of 0.001 ps is used to realize the timing module.

The collimation unit is based on a simple monostatic coaxial arrangement using off-the-shelf telecom-grade optical components, including aspheric lenses, single mode fibers, fiber-to-free space collimators, and 3-port fiber optic circulators. Collimated probe pulses in a Gaussian spatial mode at 1554.1 nm are transmitted toward the target. An angle polished fiber connector and an anti-reflection coated aspheric collimation lens are used to minimize the Fresnel reflection within the collimator. The circulator separates the outgoing probe signal pulses and the incoming backscattered photons with minimum isolation of 55 dB. This coaxial and bidirectional design reduces the number of optical components while simplifying the optical alignment, as the transmitter and receiver optics share a common optical axis. The backscattered probe signal photons are sent to the fiber pig-tailed PPLN waveguide with in-line filters. In the detection unit, both received signal and triggering pump are first passed through fiber polarization controllers and then combined in a WDM filter before being fiber-coupled into the nonlinear waveguide. In the spectral filtering module, the up-converted signal is separated from the triggering pump by using in-line filters, comprising a shortpass dichroic filter (cut off at 950 nm) and a 3 band pass filter (e.g., center wavelength: 780 nm, full-width half-maximum bandwidth: 3 nm). This eliminates any out-of-band noise, including those from the second harmonic generated by the triggering pump in the PPLN waveguide. Finally, the up-converted photons are coupled into a 50 micron diameter multimode fiber and detected by a fiber coupled, ultralow noise Si-APD.

Figure 5A:
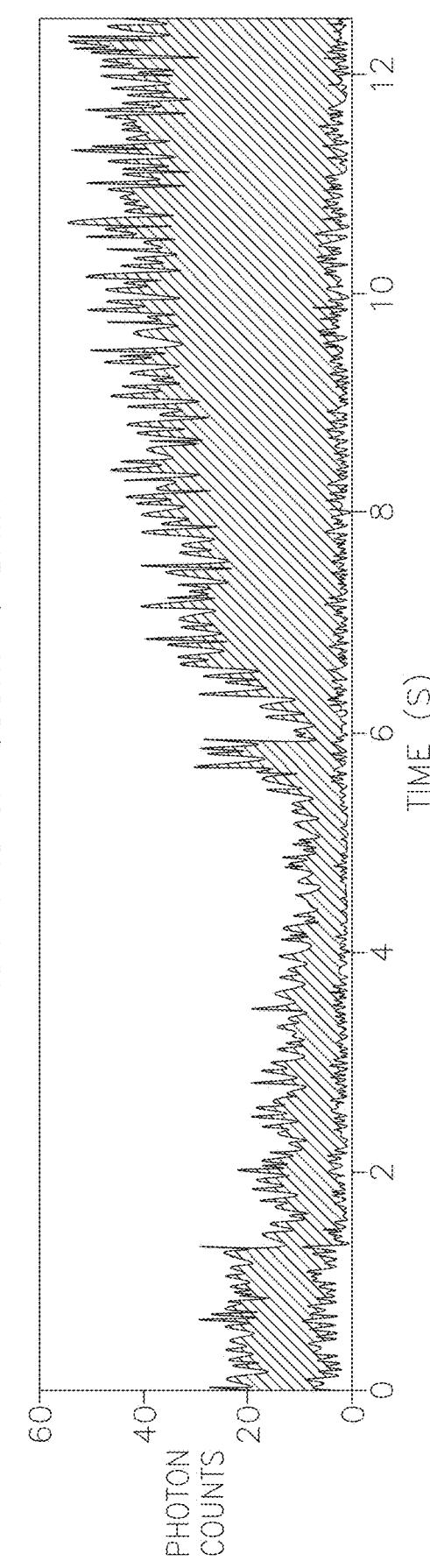
FIGS. 5A-5C are examples of the raw photon counting data sampled over 12 seconds and its Fourier transformed frequency analysis, in accordance with the present invention.
Figure 5B:
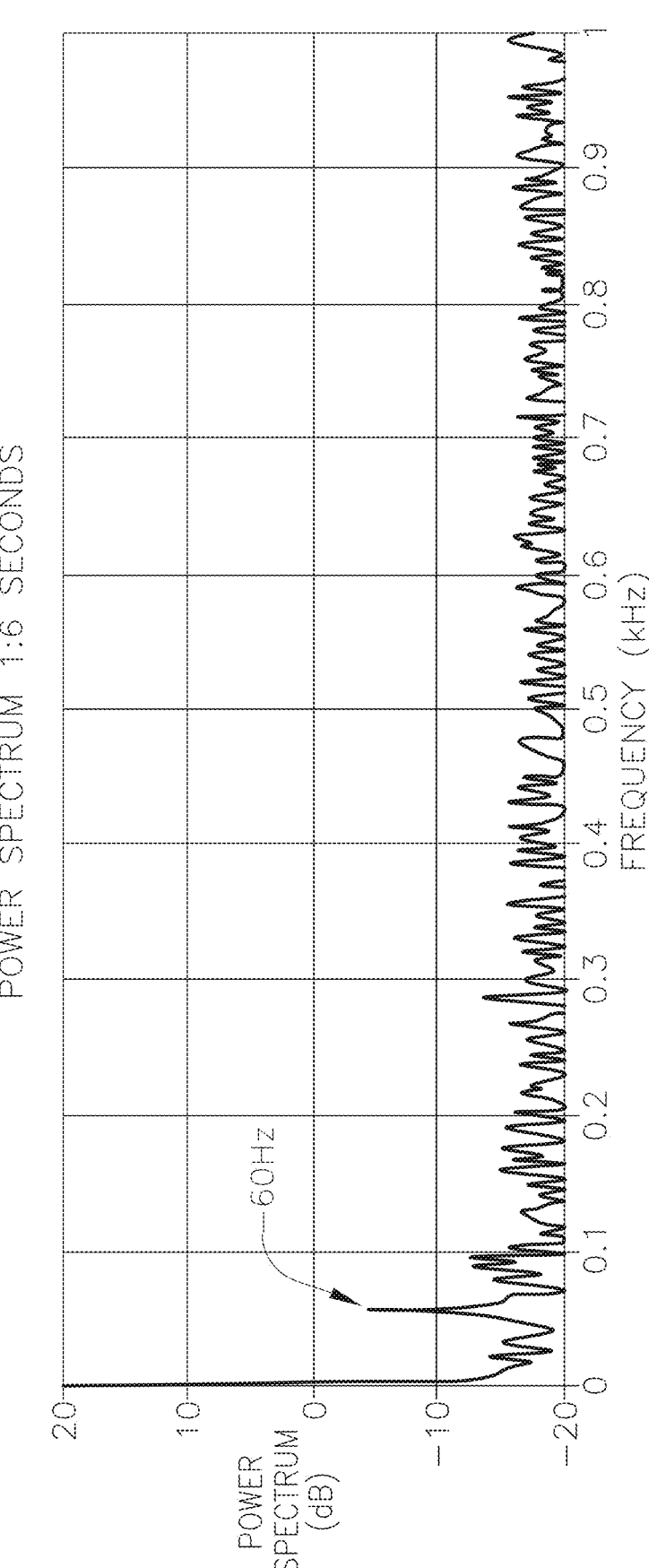
Figure 5C:
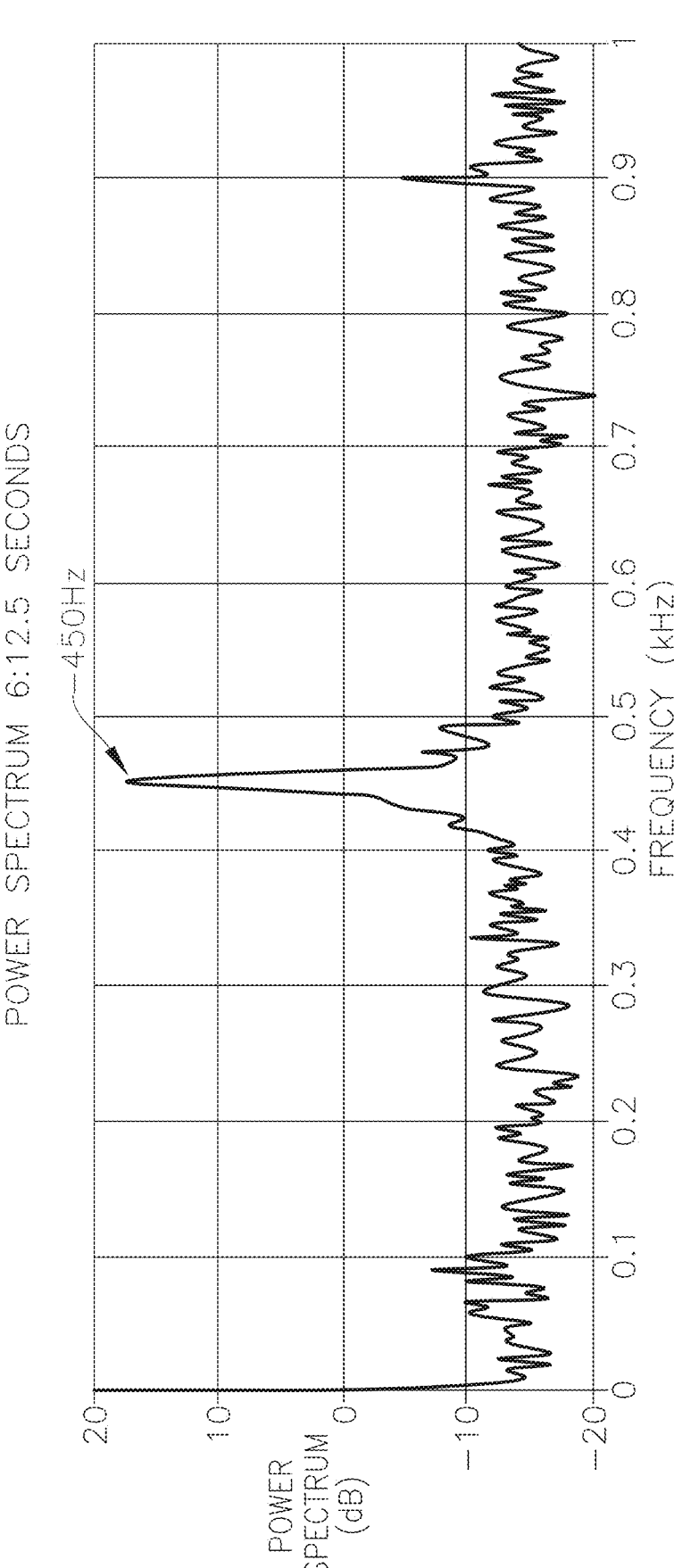
Figure 6:
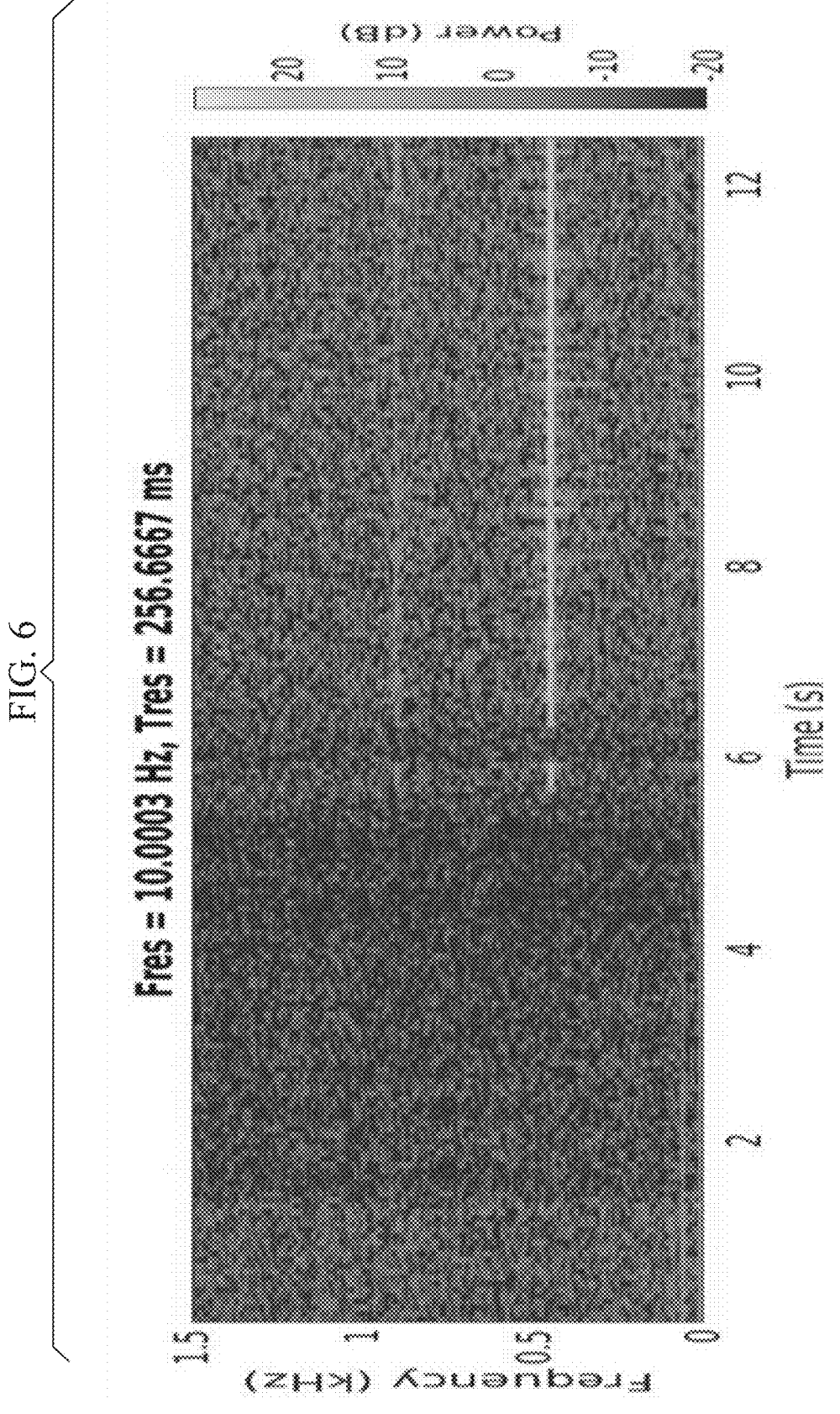
FIG. 6 is an example of the spectrogram of vibrational measurement sampled over 12 seconds, in accordance with an embodiment of the present invention.
Figure 7A:
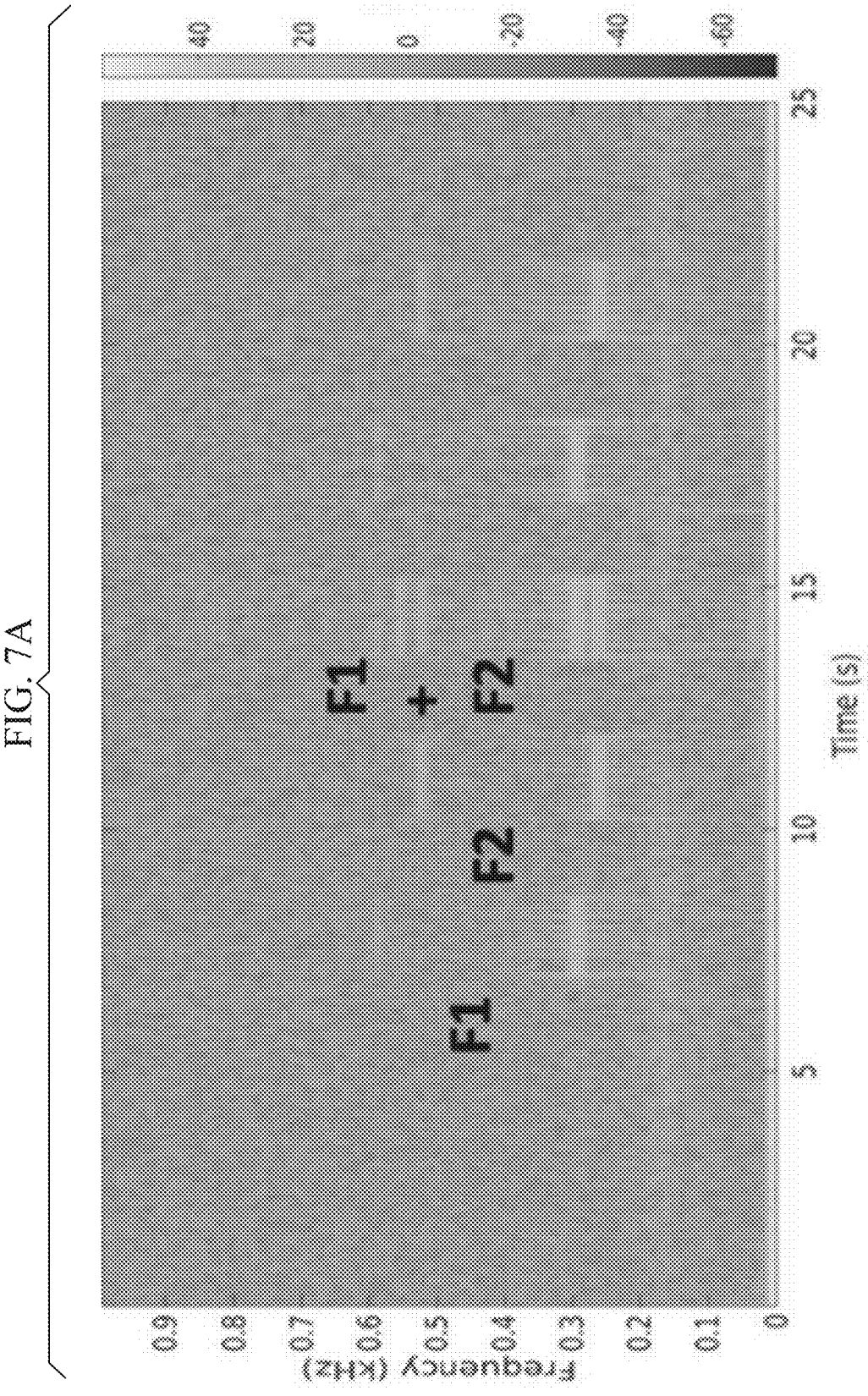
FIG. 7A is an example of a measured acoustic spectrogram sampled over 12 seconds, in accordance with the present invention.
Figures 7B, 7C, 7D:
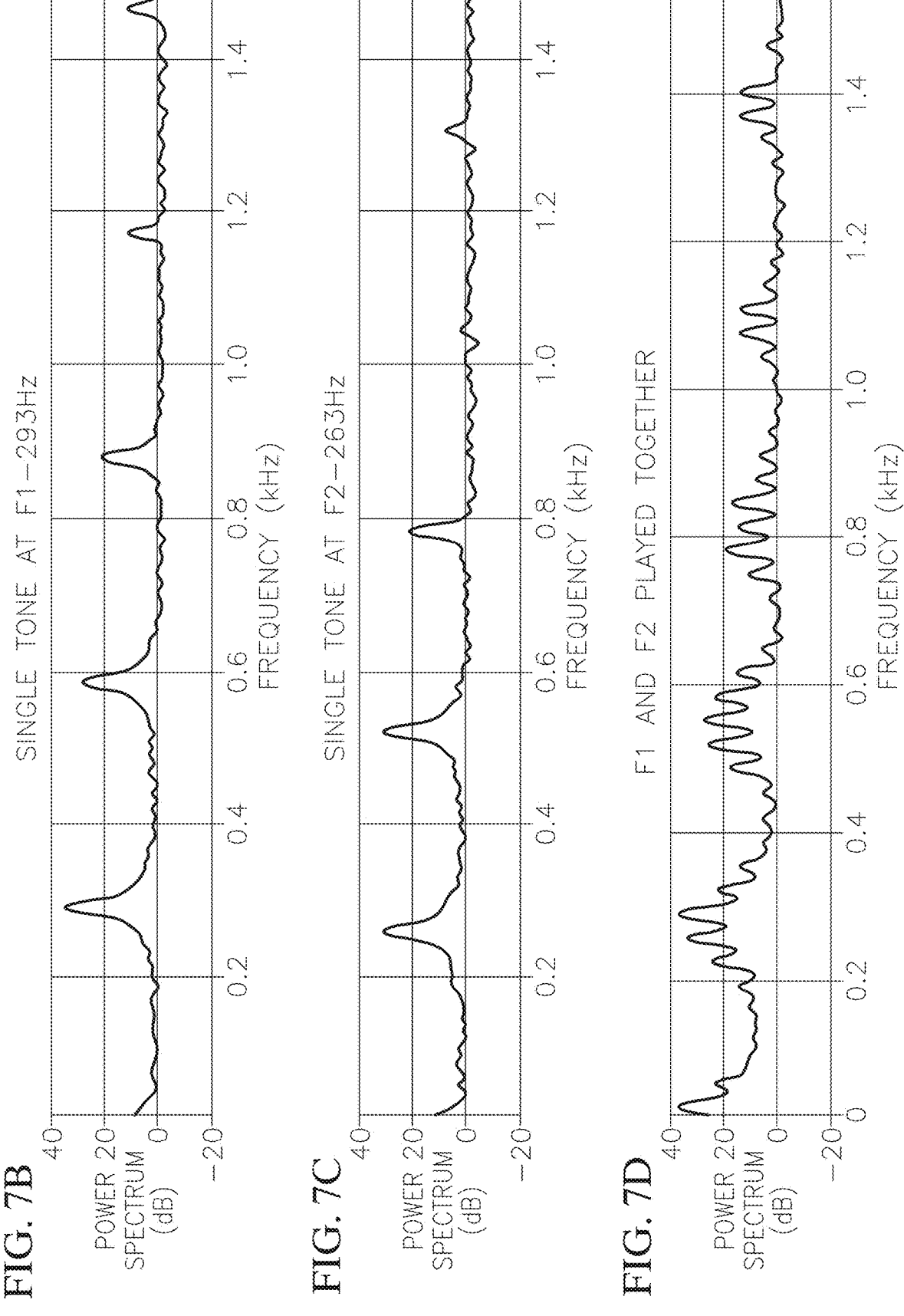
FIGS. 7B and 7C show single tone frequencies associated with the spectrogram of FIG. 7A.
FIG. 7D shows dual-tone frequencies associated with the spectrogram of FIG. 7A.
Figure 8A:
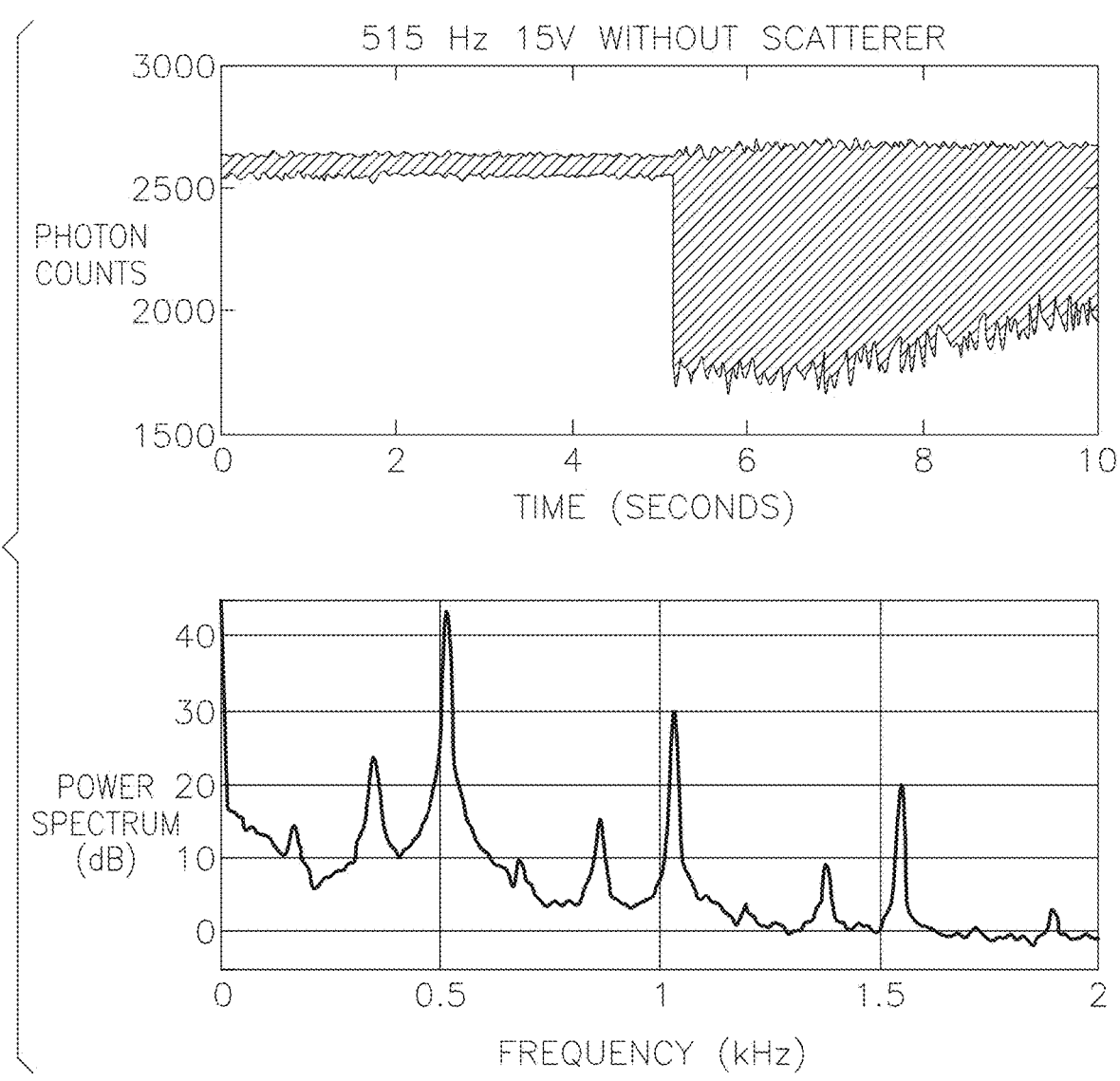
FIG. 8 depicts quantum photonics vibrometry sensing through a highly scattering medium, showing time resolved photon counting data without the scattering medium (8A) and with the scattering medium (8C), FIGS. 8B and 8D being, respectively, the corresponding spectrograms.
Figure 8B:
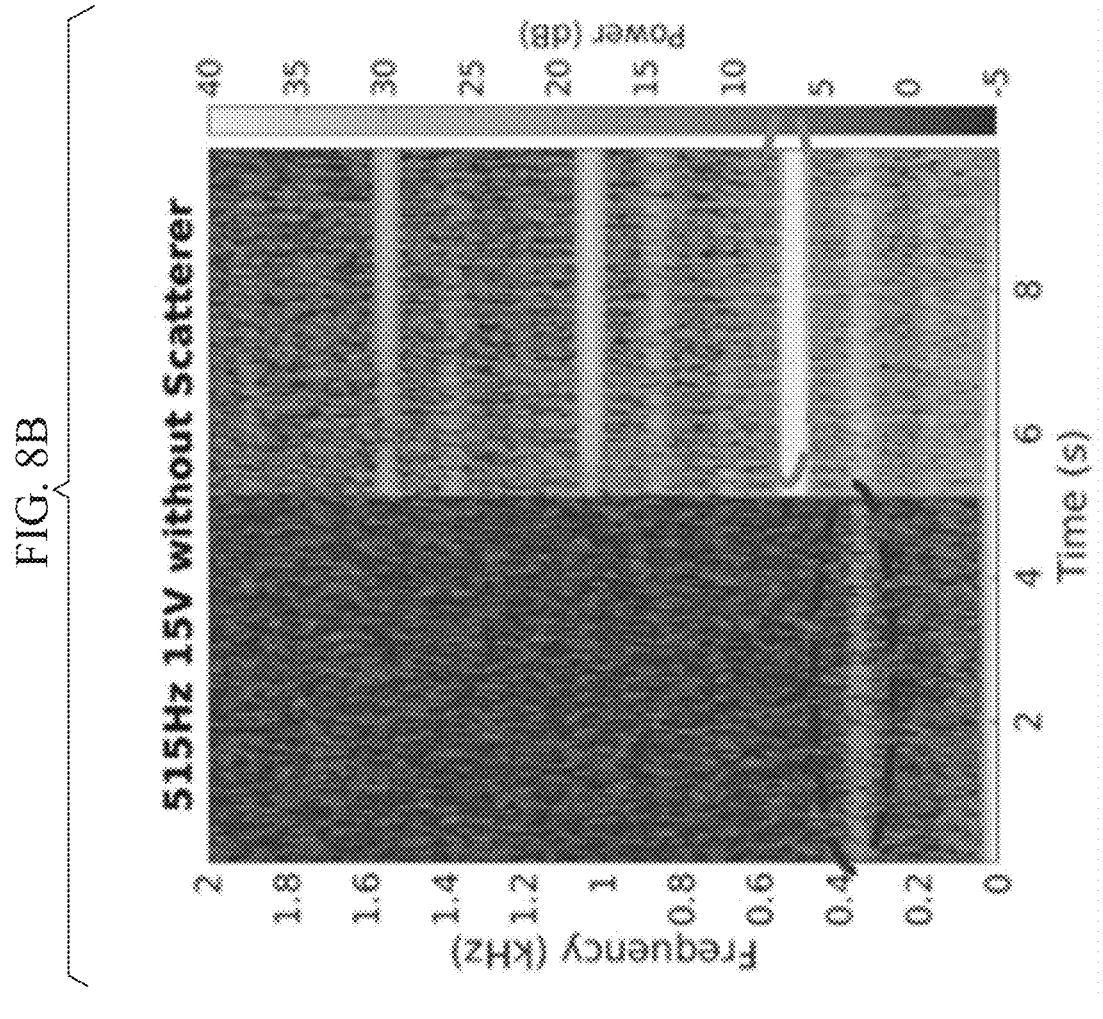
Figure 8C:
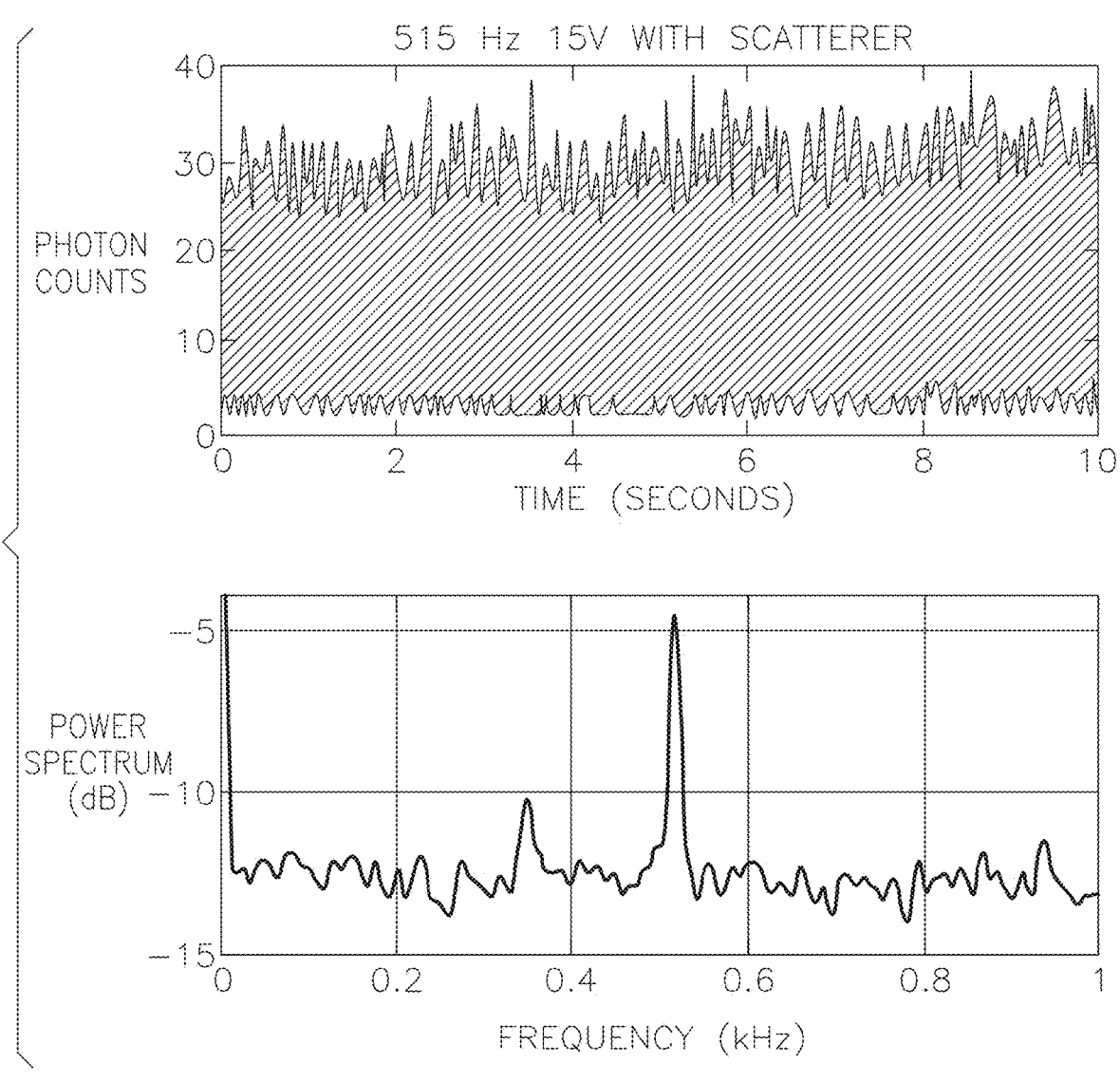
Figure 8D:
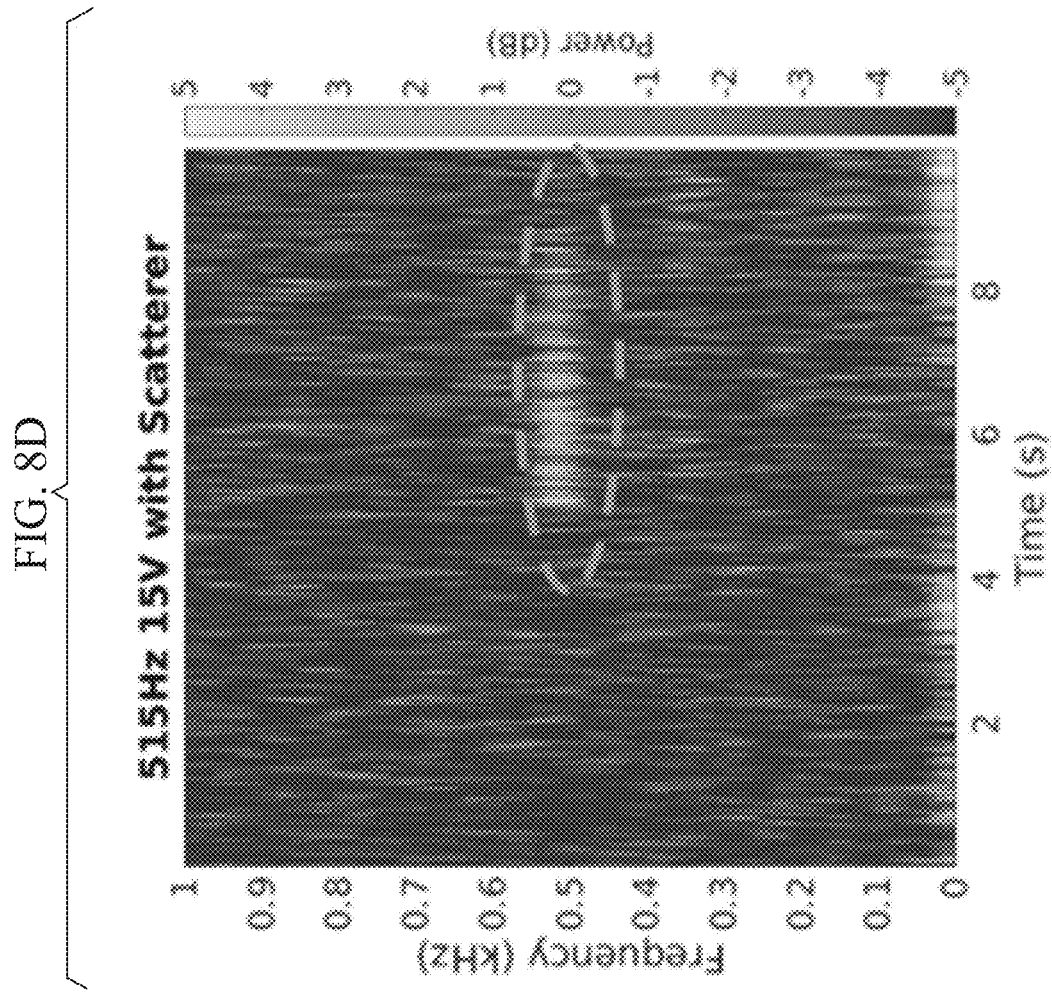
Figure 9:
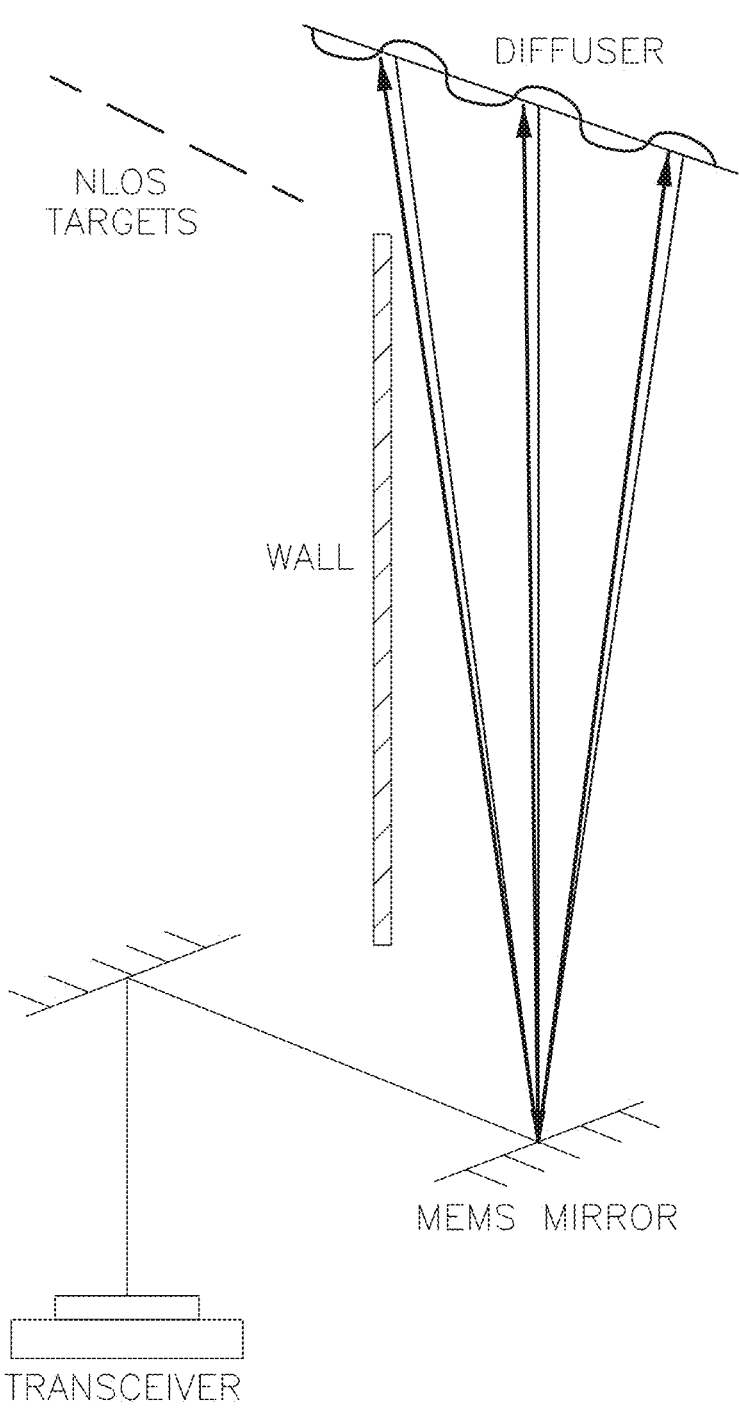
FIG. 9 is a schematic diagram depicting quantum photonics vibrometry for non-line-of-sight optical acoustic and vibration sensing, in accordance with an embodiment of the present invention.
Figure 10A:
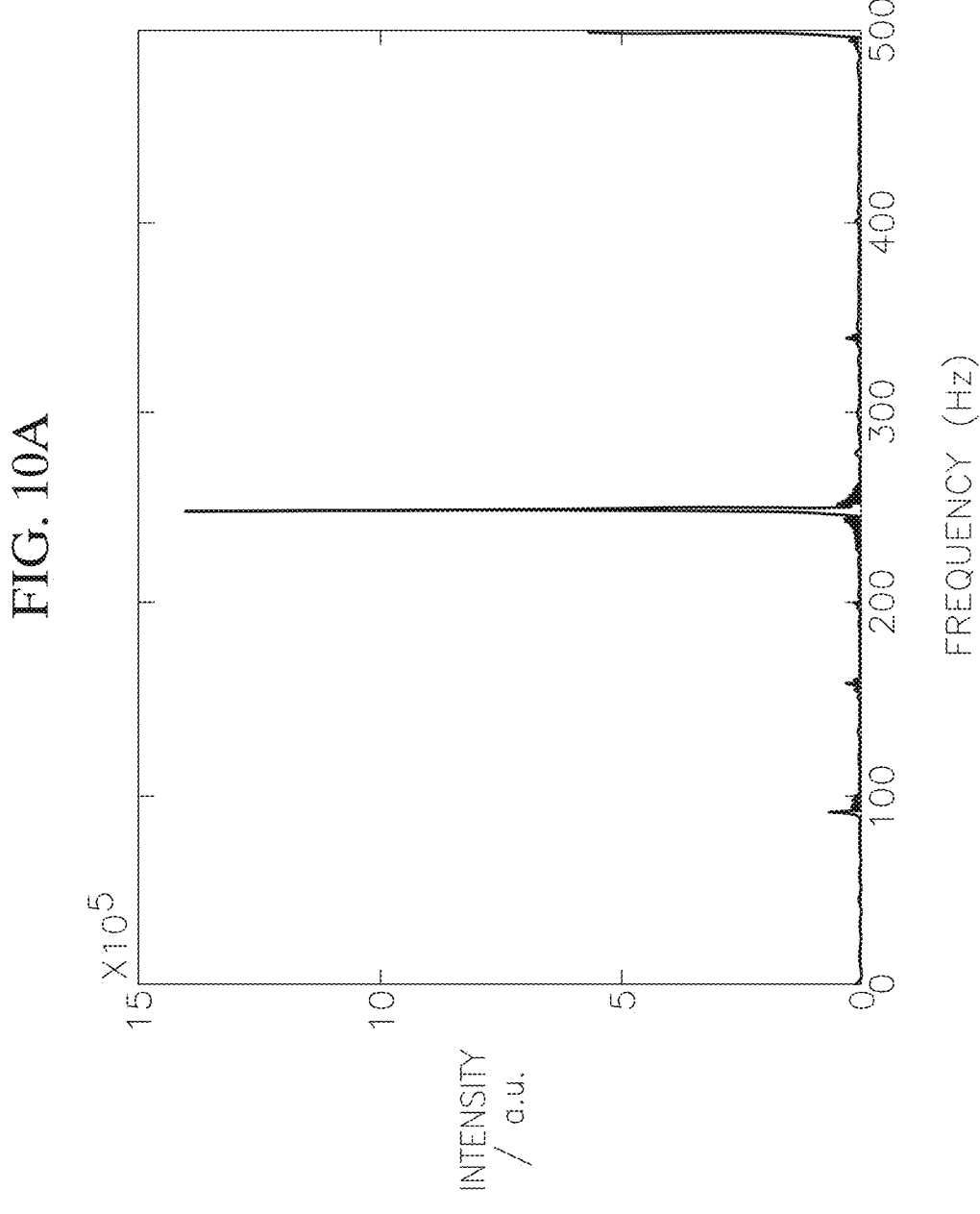
FIG. 10 is data obtained using the methods of FIG. 10, showing Fourier transforms of photon counting data for two targets (FIGS. 10A and 10B), with different vibrational frequencies, wherein FIGS. 10C and 10D, respectively, are the corresponding spectrograms.
Figure 10B:
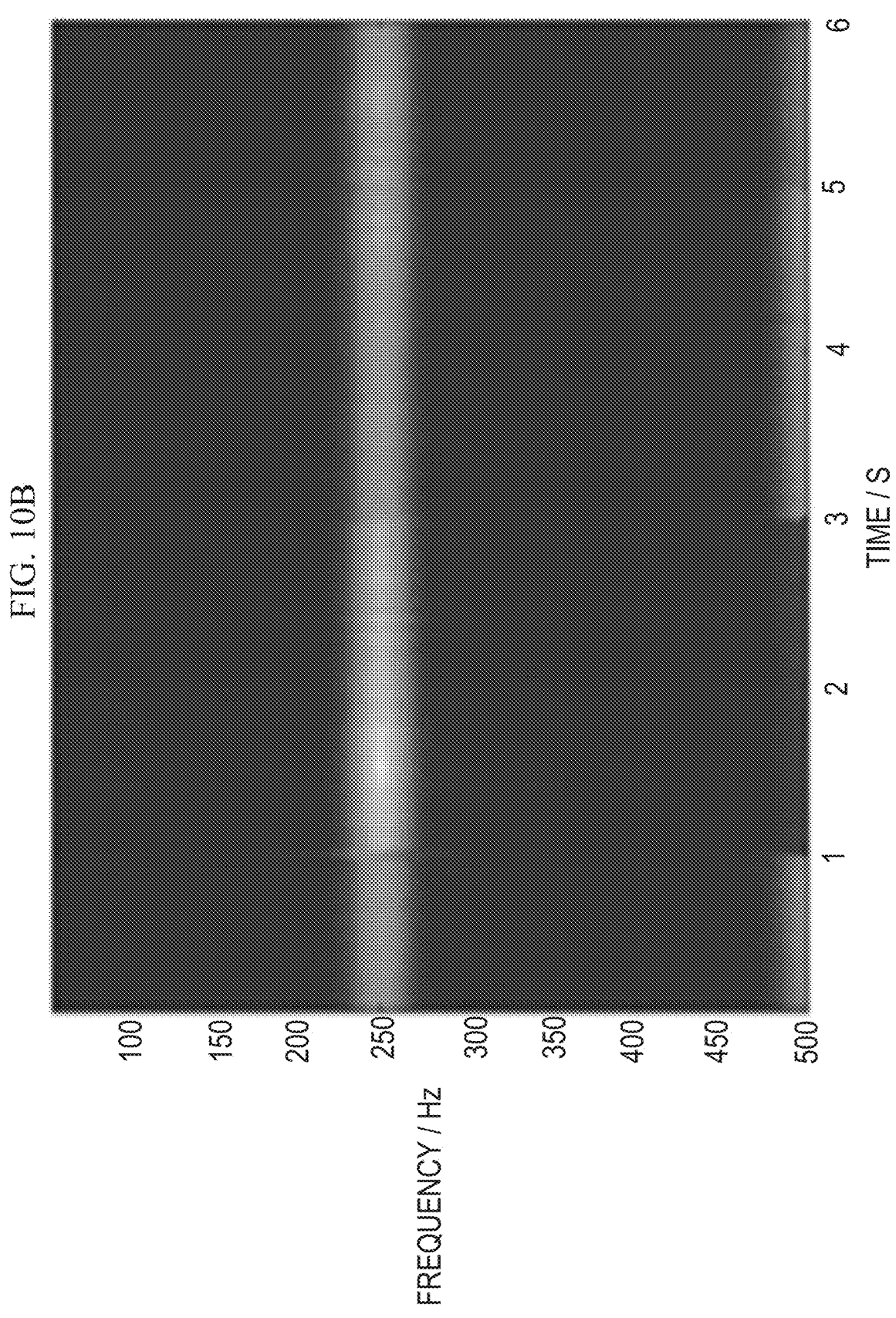
Figure 10C:
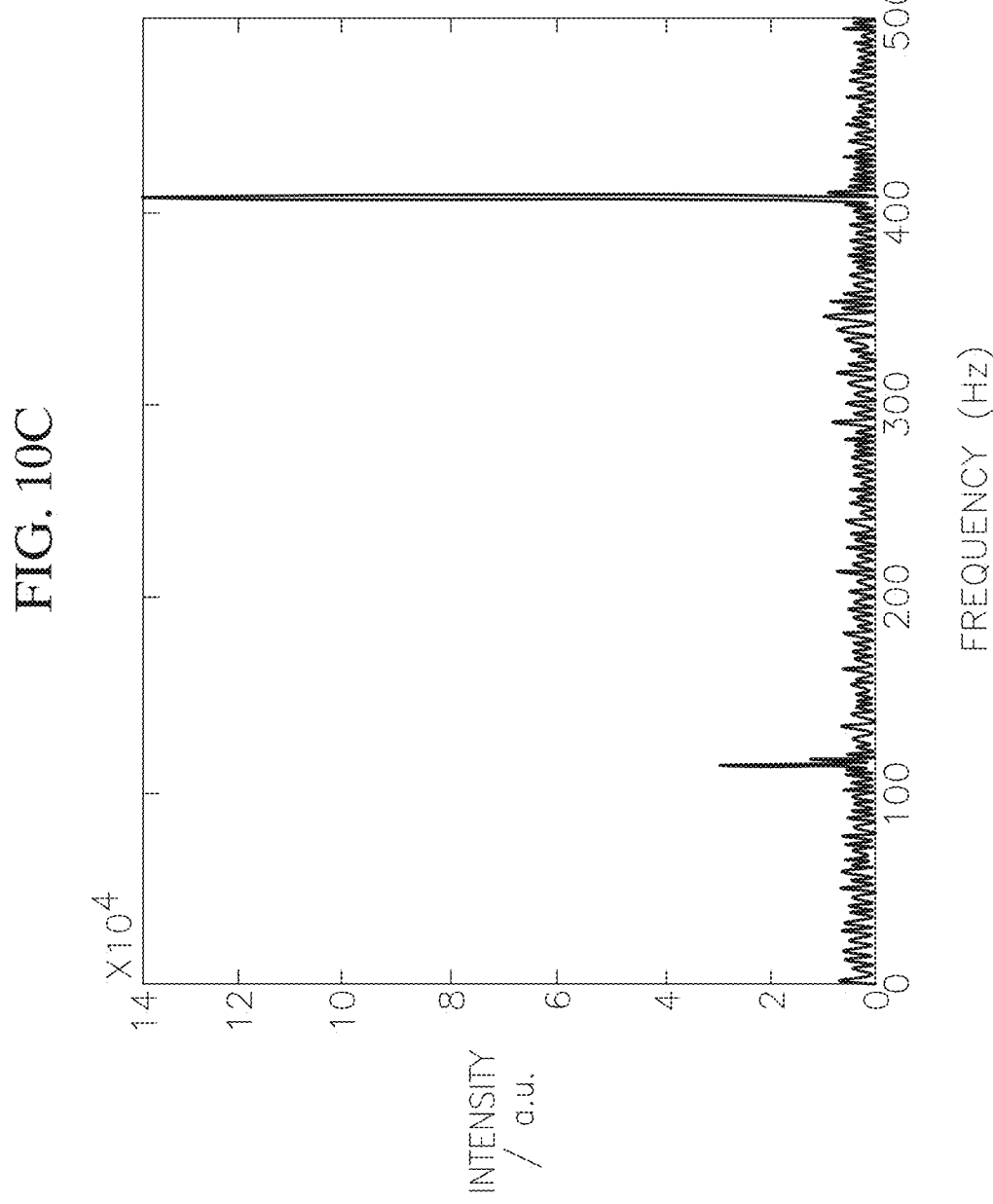
Figure 10D:
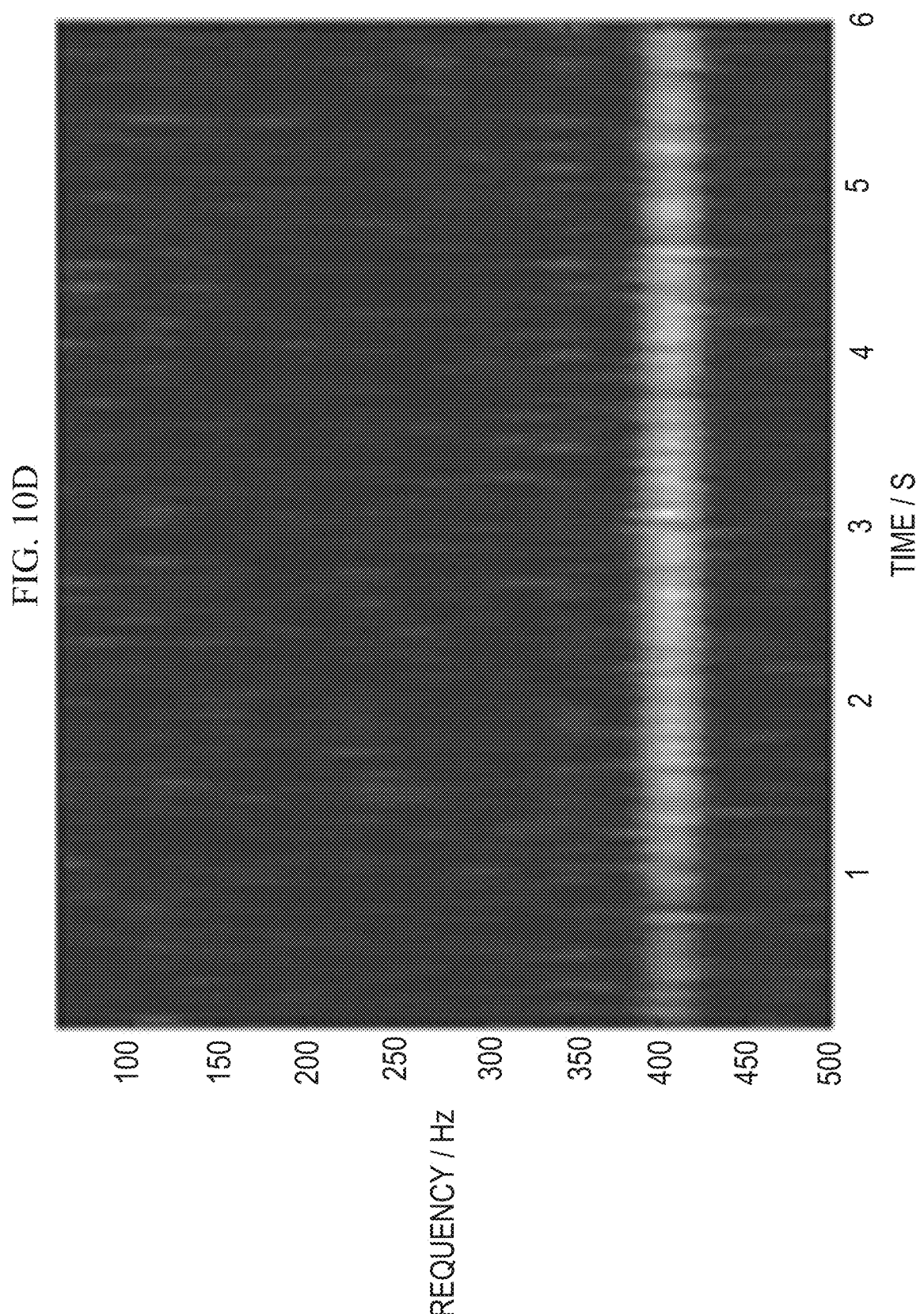

QPV utilizes an upconversion single photon detector (USPD) capable of picosecond time gating or Quantum Parametric Mode Sorting (QPMS) with carefully selected few picoseconds pump and probe pulses. The conversion efficiency of backscattered signal photons is a function of their intensity correlation with the pump pulses, where the signal photons that are temporally aligned with the pump pulses in the PPLN will be upconverted efficiently and detected by the Si-APD. As a result, the detection efficiency for signal photons in the USPD, $\eta(\Delta t)$, is a function of time alignment between the pump and returning probe signal $\Delta t = T_{pump} - T_{probe}$. Here $T_{pump}$ is the arrival time of the pump into the PPLN waveguide relative to a fixed reference, which is controlled using the ODL, and $T_{probe}$ corresponds to the time of flight (ToF) of the probe pulses. The photon counting rate N reflects the average intensity correlation of the pump and probe over a defined period. A photon counting sample is obtained by counting the number of upconverted photons (N) over a fixed dwell-time $\delta$. Given backscattered photon flux captured by the receiver as $\Phi_{BS}$ (number of photon per second), the counting rate measurement is given as $N_\delta \propto \eta$ $(\Delta t) \cdot \int_0^\delta \Phi_{BS} dt$. Vibrational motion of the target causes changes in the ToF of consecutive returning probe pulses and will be reflected in the photon detection rate $N_\delta(T)$ sampled at different times, shown in FIGS. 5A-5C. Fast sampling of the photon detection rate with an FPGA enables recovery of mechanical vibrational or acoustic properties, where sampling rate is regulated by the clock rate of the FPGA to a maximum of upwards of 1 GHz. By sampling the $N_\delta(T)$ over a period of time using the FPGA, various signal processing techniques can be applied, including, by way of example, a Fourier transform on a time series of raw photon counting data $N_\delta(T)$ to recover the spectrogram, thus retrieving vibrational frequencies and amplitude. Exemplary time series photon counting data and its corresponding Fourier spectrum are shown in FIGS. 5A-5C. The time series spectrum analysis, or spectrogram, for real time vibration monitoring of this exemplary device is shown in FIG. 6. The exemplary device made in accordance with embodiments of the present invention is capable of resolving multiple tones of frequencies simultaneously, as shown in FIGS. 7A-7D. The present invention combines single spatial mode optical transceivers with QPMS and picosecond optical gating features to isolate ballistic backscattered photons from the multiple-scattered ones, and creates a mechanism to distinguish between ballistic photons from the target arriving only picoseconds apart. This enables optical vibrometric detection through highly scattering environments with very few detected photons while still obtaining sufficient signal to noise ratio as shown in FIGS. 8A-8D. In the non-line-of-sight scenario as shown in FIG. 9, the invention disclosed herein can perform photonics vibrometry around corners and isolates and identifies the vibrational properties of two closely located targets (i.e., 3 cm apart). As shown in FIGS. 10A-10D, distinct frequency spectra and spectrograms are observed for the two targets with the TOF of ballistic photons only arriving 60 ps apart.

Further embodiments of the present invention and details pertaining to same are presented in the publication by Patrick Rehain et al., titled "Single Photon Vibrometry," Optics Letters, Vol. 46, No. 17/1, September 2021, pp. 4346-4349, the entire disclosure of which is incorporated herein by reference and made part of the present disclosure for all purposes.

It will be understood that the embodiments described herein are merely exemplary and that a person skilled in the art may make many variations and modifications without departing from the spirit and scope of the invention. All such variations and modifications are intended to be included within the scope of the invention.

The invention claimed is:

1. A method for remote vibration and acoustic measurement, comprising the steps of:
   creating a probe signal;
   creating a pump optical pulse;
   collimating said probe signal;
   transmitting said probe signal to a target;
   receiving a backscattered signal from said target;
   temporally aligning said pump optical pulse with said backscattered signal;
   upconverting said backscattered signal to obtain a frequency upconverted backscattered signal;
   performing picosecond time gating detection and quantum parametric mode selection on said frequency upconverted backscattered signal to obtain photon counting data; and
   obtaining vibration and/or acoustic measurement data from said photon counting data.

2. The method of claim 1, wherein said probe signal and said pump optical pulse have frequencies between the ultraviolet and infrared bands.

3. The method of claim 1, wherein said photon counting data is single-photon sensitive.

4. The method of claim 1, wherein said upconverting step involves the step of converting only photons in a single spatial-temporal mode similar to a shape of said pump optical pulse.

5. The method of claim 4, wherein background noise photons in all other modes other than said single spatial-temporal mode are rejected.

6. The method of claim 1, wherein said pump optical pulse and said probe signal are created using an optical pulse generator.

7. The method of claim 6, wherein said optical pulse generator comprises at least one element selected group the group consisting of: a femtosecond mode locked fiber laser; a synchronized electro-opto pulse generator; and a synchronized picosecond mode locked fiber laser.

8. The method of claim 6, wherein said optical pulse generator further comprises an optical frequency comb and a femtosecond mode locked fiber laser.

9. The method of claim 6, wherein said optical pulse generator comprises one or more electro-optic pulse generators adapted to synchronize said probe signal with said pump optical pulse.

10. The method of claim 1, wherein said transmitting step is performed using an optical transceiver.

11. The method of claim 10, wherein said transceiver is integrated as free space optics or fiber, or as an integrated photonics chip.

12. The method of claim 10, further comprising the step of steering said probe signal using a beam steering unit.

13. The method of claim 12, wherein said beam steering unit comprises micro electro mechanical system based mirrors or digital micro-mirror devices.

14. The method of claim 10, wherein said optical transceiver is further configured to operate as a receiver to facilitate said receiving step.

15. The method of claim 1, wherein said performing step is performed with by a single photon detection unit.

16. The method of claim 15, wherein said single photon detection unit is capable of mode selective frequency conversion.

17. The method of claim 15, wherein said single photon detection unit is also configured to perform said upconverting step.

18. The method of claim 1, wherein said upconverting step is performed by a nonlinear waveguide, optical bandpass filters, and a photodiode configured to detect upconverted signals.

19. The method of claim 18, wherein said waveguide is a periodically poled lithium niobate waveguide.

20. The method of claim 1, wherein said obtaining step is performed by a controller module.

21. The method of claim 20, wherein said temporally aligning step is facilitated by passing said pump optical pulse through an optical delay line controlled by said controller module.

22. The method of claim 1, further comprising the step of performing a mathematical transform on said photon counting data.

23. The method of claim 22, wherein said mathematical transform is a Fourier Transform.

24. The method of claim 1, adapted for use at ranges of about one kilometer or more.

25. The method of claim 1, adapted for use with nonlinear media.

26. The method of claim 1, adapted for use with multi-scattering or highly scattering media.

27. The method of claim 1, adapted for use with targets outside of a line-of-sight.

28. The method of claim 1, adapted for use in the presence of strong turbulence.

29. A system for remote vibration and acoustic measurement, comprising:

means for creating a probe signal;

means for creating a pump optical pulse;

means for collimating said probe signal;

means for transmitting said probe signal to a target;

means for receiving a backscattered signal from said target;

means for temporally aligning said pump pulse with said backscattered signal;

means for upconverting said backscattered signal to obtain a frequency upconverted backscattered signal;

means for performing picosecond time gating detection on said frequency upconverted backscattered signal and performing quantum parametric mode selection on said frequency upconverted backscattered signal to obtain photon counting data; and means for extracting vibration and/or acoustic measurement data from said photon counting data.

* * * * *